United States Patent
Xu et al.

(10) Patent No.: US 12,021,749 B2
(45) Date of Patent: Jun. 25, 2024

(54) IPV6 ADDRESS MANAGEMENT IN IAB SYSTEM

(71) Applicant: NOKIA TECHNOLOGIES OY, Espoo (FI)

(72) Inventors: Xiang Xu, Nanjing (CN); Colin Kahn, Morristown, NJ (US); Dawid Koziol, Glogow (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 391 days.

(21) Appl. No.: 17/289,004

(22) PCT Filed: Nov. 1, 2018

(86) PCT No.: PCT/CN2018/113436
§ 371 (c)(1),
(2) Date: Apr. 27, 2021

(87) PCT Pub. No.: WO2020/087445
PCT Pub. Date: May 7, 2020

(65) Prior Publication Data
US 2021/0409328 A1   Dec. 30, 2021

(51) Int. Cl.
*H04L 45/745* (2022.01)
*H04W 8/26* (2009.01)
*H04W 80/04* (2009.01)

(52) U.S. Cl.
CPC ............. *H04L 45/745* (2013.01); *H04W 8/26* (2013.01); *H04W 80/04* (2013.01)

(58) Field of Classification Search
CPC ........ H04L 45/745; H04W 8/26; H04W 80/04
See application file for complete search history.

(56) References Cited

U.S. PATENT DOCUMENTS

2010/0211775 A1* 8/2010 Vogt ...................... H04L 63/126
713/163

FOREIGN PATENT DOCUMENTS

| CN | 1859443 A | * 11/2006 | ......... H04L 29/1232 |
| CN | 101690135 A | 3/2010 | |
| WO | WO-2005076579 A1 * | 8/2005 | ............. H04L 29/06 |
| WO | WO 2010/107357 A1 | 9/2010 | |

(Continued)

OTHER PUBLICATIONS

Extended European Search Report for European Application No. 18938289.8 dated May 17, 2022, 9 pages.

(Continued)

*Primary Examiner* — Saad A. Waqas
(74) *Attorney, Agent, or Firm* — ALSTON & BIRD LLP

(57) ABSTRACT

Embodiments of the present disclosure relate to a method, a device and a computer readable medium for IPv6 address management in an IAB system. The method comprises obtaining an IPv6 prefix for an IAB node in the IAB system, the prefix being associated with the donor central unit or a donor distributed unit in the IAB system; determining an interface identity for the IAB node; and generating, based on the Internet Protocol Version 6, IPv6, prefix and the interface identity, an IPv6 address for the IAB node for communication between the donor central unit and the IAB node. As a result, IPv6 address management for an IAB node in an IAB system is implemented.

19 Claims, 5 Drawing Sheets

(56) References Cited

FOREIGN PATENT DOCUMENTS

WO    WO-2011042767 A1 *  4/2011  ....... H04L 29/12283
WO    WO 2018/063998 A1    4/2018

OTHER PUBLICATIONS

Ericsson et al., "IP Configuration for the IAB Node", 3GPP TSG-RAN WG2 AH1807, R2-1810563, (Jul. 2-6, 2018), 6 pages.
KDDI Corporation, "Removal of the FFS on IAB Routing Update Procedure", 3GPP TSG-RAN WG3 #101bis, R3-185403, (Oct. 8-12, 2018), 3 pages.
Ericsson et al., "TP to TR 38.874: Using F1 Functionality to Support Redundant Paths", 3GPP TSG-RAN WG3 Meeting #101bis, R3-185837, (Oct. 8-12, 2018), 5 pages.
First Examination Report for Indian Application No. 202147022606 dated Feb. 28, 2022, 5 pages.
"3rd Generation Partnership Project; Technical Specification Group Core Network and Terminals; Non-Access-Stratum (NAS) protocol for 5G System (5GS); Stage 3 (Release 15)", 3GPP Ts 24.501 v15.1.0, (Sep. 2018), 398 pages.
"3rd Generation Partnership Project; Technical Specification Group Core Network and Terminals; Non-Access-Stratum (NAS) protocol for Evolved Packet System (EPS); Stage 3 (Release 16)", 3GPP Ts 24.301 v16.2.0, (Sep. 2019), 558 pages.
"3rd Generation Partnership Project; Technical Specification Group Radio Access Network; NG-RAN; Architecture description (Release 15)" 3GPP Ts 38.401 v15.3.0, (Sep. 2018), 39 pages.
"3rd Generation Partnership Project; Technical Specification Group Radio Access Network; NG-RAN; F1 application protocol (F1AP) (Release 15)", 3GPP TS 38.473 v15.3.0, (Sep. 2018), 176 pages.
"3rd Generation Partnership Project; Technical Specification Group Radio Access Network; NG-RAN; F1 data transport (Release 15)", 3GPP TS 38.474 v15.2.0, (Sep. 2018), 8 pages.
"3rd Generation Partnership Project; Technical Specification Group Radio Access Network; NG-RAN; F1 general aspects and principles (Release 15)", 3GPP TS 38.470 v15.3.0, (Sep. 2018), 12 pages.
"3rd Generation Partnership Project; Technical Specification Group Radio Access Network; NR; Radio Resource Control (RRC) protocol specification (Release 15)", 3GPP TS 38.331 v15.3.0, (Sep. 2018), 445 pages.
"3rd Generation Partnership Project; Technical Specification Group Radio Access Network; Study on Integrated Access and Backhaul; (Release 15)", 3GPP TR 38.874 v0.5.0, (Oct. 2018), 78 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 v16.0.0, (Sep. 2018), 410 pages.
"3rd Generation Partnership Project; Technical Specification Group Services and System Aspects; System Architecture for the 5G System; Stage 2 (Release 15)", 3GPP TS 23.501 v15.3.0, (Sep. 2018), 226 pages.
Arkko et al., "Internet Protocol Version 6 (IPv6) for Some Second and Third Generation Cellular Hosts", Network Working Group, IETF RFC 3316, (Apr. 2003), 22 pages.
Armitage et al., "IPv6 Over Non-Broadcast Multiple Access (NBMA) Networks", Network Working Group, IETF RFC 2491, (Jan. 1999), 44 pages.
Droms, R., "Stateless Dynamic Host Configuration Protocol (DHCP) Service for IPV6", Network Working Group, IETF RFC 3736, (Apr. 2004), 9 pages.
Ericsson et al., "TP for TR 38.874: IP Configuration for the IAB Node when Terminating Full F1", 3GPP TSG RAN WG3 MeetingAH 1807, R3-184045, (Jul. 2-6, 2018), 6 pages.
Ericsson, "Protection of Internal gNB Interfaces", 3GPP TSG-SA WG3 Meeting #91bis, S3-181838, (May 21-15, 2018), 2 pages.
Huawei et al., "Physical Layer Design for NR IAN", 3GPP TSG RAN WG1 Meeting #94, R1-1808101, (Aug. 20-24, 2018), 14 pages.
International Search Report and Written Opinion for International Application No. PCT/CN2018/113436 dated Aug. 7, 2019, 9 pages.
Narten et al., "Neighbor Discovery for IP Version 6 (IPv6)", Network Working Group, IETF RFC 4861, (Sep. 2007), 97 pages.
Thomson et al., "IPv6 Stateless Address Autoconfiguration", Network Working Group, IETF RFC 4862, (Sep. 2007), 30 pages.
Wasserman, M., "Recommendations for IPV6 in Third Generation Partnership Project (3GPP) Standards", Network Working Group, IETF RFC 3314, (Sep. 2002), 23 pages.

* cited by examiner

IPV6 ADDRESS MANAGEMENT IN IAB SYSTEM

CROSS-REFERENCE TO RELATED APPLICATIONS

This application is a national phase entry of International Application No. PCT/CN2018/113436, filed Nov. 1, 2018, the entire contents of which are incorporated herein by reference.

FIELD

Embodiments of the present disclosure generally relate to the field of telecommunication, and in particular, to methods, devices and computer readable media for internet protocol version 6 (IPv6) address management for an integrated access and backhaul (IAB) node in an IAB system.

BACKGROUND

The 3rd Generation Partnership Project (3GPP) determines standards and specifications for new radio (NR) Integrated Access and Backhaul (IAB) (e.g., via TR38.874). Various layer 2 ("L2") and layer 3 ("L3") based solutions have been proposed. In the L2-based solutions, an IAB node contains a distributed unit (DU) and packets are forwarded by the radio layers below packet data convergence protocol (PDCP) layer. In the L3-based solutions, an IAB node contains a DU and/or a gNB, and packets are forwarded at layers above PDCP layer. In both cases, intermediate IAB nodes perform hop-by-hop routing to maintain connectivity between a serving IAB node for a terminal device and an IAB donor that has a non-wireless connection to upstream nodes. The terminal device or the IAB node may have multi-connectivity to multiple IAB nodes or IAB donors.

Multi-hop wireless backhauling provides greater range extension than single hop backhauling. This is especially beneficial for backhaul at frequencies above-6 GHz due to limited range. Multi-hop backhauling further enables backhauling around obstacles, for example, buildings and other clutter in urban environments where line-of-sight between nodes is obstructed.

SUMMARY

In general, example embodiments of the present disclosure provide methods, devices and computer readable mediums for communication using 5G.

In a first aspect, a communication method implemented at a donor central unit in an IAB system is provided. An IPv6 prefix for an IAB node in the IAB system is obtained. The prefix is associated with the donor central unit or a donor distributed unit in the IAB system. An interface identity is determined for the IAB node. An IPv6 address for the IAB node for communication between the donor central unit and the IAB node is generated based on the IPv6 prefix and the interface identity.

In a second aspect, a communication method implemented at an IAB node in an IAB system is provided. An Internet Protocol Version 6, IPv6, prefix and information about an interface identity are received from a donor central unit in the IAB system via a donor distributed unit in the IAB system. The prefix is associated with the donor distributed unit or the donor central unit. An IPv6 address for the IAB node for communication between the donor central unit and the IAB node is generated based on the IPv6 prefix and the information about the interface identity.

In a third aspect, a device is provided. The device comprises at least one processor; and at least one memory including computer program code. The at least one memory and the computer program code are configured to, with the at least one processor, cause the device to perform at least the method of according to the first aspect.

In a fourth aspect, a device is provided. The device comprises at least one processor; and at least one memory including computer program code. The at least one memory and the computer program code are configured to, with the at least one processor, cause the device to perform at least the method of according to the second aspect.

In a fifth aspect, there is provided an apparatus comprising a means for obtaining an Internet Protocol Version 6, IPv6 prefix for an IAB node in the IAB system, the prefix being associated with the donor central unit or a donor distributed unit in the IAB system; a means for determining an interface identity for the IAB node; and a means for generating, based on the Internet Protocol Version 6, IPv6, prefix and the interface identity, an IPv6 address for the IAB node for communication between the donor central unit and the IAB node.

In a sixth aspect, there is provided an apparatus comprising a means for receiving, from a donor central unit in the IAB system via a donor distributed unit in the IAB system, an Internet Protocol Version 6, IPv6, prefix and information about an interface identity, the prefix being associated with the donor distributed unit or the donor central unit; and a means for generating, based on the IPv6 prefix and the information, an IPv6 address for the IAB node for communication between the donor central unit and the IAB node.

In a seventh aspect, there is provided a computer readable storage medium that stores a computer program thereon. The computer program, when executed by a processor, causes the processor to carry out the method according to the first aspect.

In an eighth aspect, there is provided a computer readable storage medium that stores a computer program thereon. The computer program, when executed by a processor, causes the processor to carry out the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
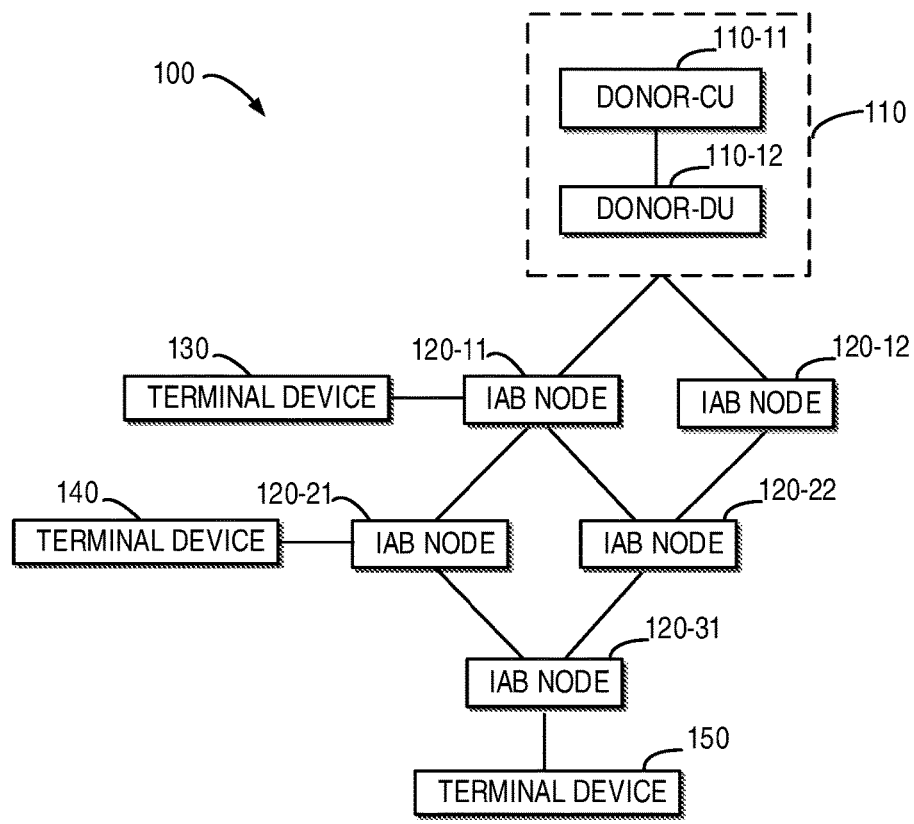
FIG. 1 shows an example IAB system in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), enhanced mobile broadband (eMBB), massive machine type communications (mMTC) and ultra-reliable low-latency communications (uRLLC) technologies. For the purpose of discussion, in some example embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), an NG-RAN node (gNB or ng-eNB), a remote radio module (RRU), a radio header (RH), a remote radio head (RRH), a low power node such as a femto, a pico, a gNB Distributed Unit (DU), an Integrated Access and Backhaul (IAB) node and a gNB Central Unit (CU) and the like. For the purpose of discussion, in some example embodiments, the gNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), multi-cell/multicast coordination entities (MCEs), mobile switching centers (MSCs) and MMEs, operation and management (O&M) nodes, Operation Support System (OSS) nodes, self-organization network (SON) nodes, positioning nodes, such as enhanced serving mobile location centers (E-SMLCs), and/or mobile data terminals (MDTs), and 5G Core network nodes such as the access management function (AMF), session management function (SMF).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), Mobile Terminals (MT), such as those embedded in IAB nodes and/or wireless customer-premises equipment (CPE). For the purpose of discussion, in the following, some example embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 shows an example IAB system 100 in which example embodiments of the present disclosure can be implemented. The IAB system 100 includes an IAB donor 110 and IAB nodes 120-11, 120-12, 120-21, 120-22, 120-31 underneath the IAB donor 110. The IAB nodes 120-11, 120-12, 120-21, 120-22, 120-31 may be collectively referred to as IAB node 120.

The IAB donor 110 may be implemented as a gNB that terminates wireless backhaul radio interface from one or more IAB nodes. The IAB donor 110 has wired/fiber connectivity with a core network. The IAB donor 110 may include a central unit (CU) 110-11 and one or more DUs. FIG. 1 shows that the IAB donor 110 includes a DU 110-12 by way of example. Hereinafter, the CU of the IAB donor is also referred to as Donor-CU or donor central unit; and the DU of the IAB donor is also referred to as Donor-DU or donor distributed unit.

In case where the IAB system 100 is implemented by using the L2-based solutions, the IAB node 120 may include a DU, but does not include CU. In case where the IAB system 100 is implemented by using the L3-based solutions, the IAB node 120 may include a DU or include a DU and a CU.

In example embodiments, each IAB node logically includes a mobile terminal (MT) that maintains connectivity with one or more upstream nodes (using for example, dual connectivity). Similar to a conventional user equipment which includes an MT, the MT of an IAB node may use radio resource control (RRC) signaling to supply radio link measurements of alternative upstream nodes to its current serving gNB CU. Based on signal strength, signal quality and other factors, a handover of an IAB node to a different upstream node may be triggered by RRC. The Donor-CU may also add or remove dual/Multi-Connectivity (DC/MC) legs by sending RRC Connection Reconfiguration messages. Hence, the IAB topology, such as the one shown in FIG. 1, may be non-static. The IAB topology may change over time as radio conditions fluctuate, and as IAB nodes move, are added or removed. Handover and addition or removal of DC legs may be designed to work on a time scale of seconds to minutes, corresponding to macroscopic movement of MTs through a cellular network.

A CU (such as Donor-CU or CU of an IAB node) may be a logical node which may include the functions (for example, gNB functions) such as transfer of user data, mobility control, radio access network sharing, positioning, session management etc., except those functions allocated exclusively to DUs. The CU may control the operation of the DUs over a front-haul (F1) interface. A DU is a logical node which may include a subset of the functions (for example, gNB functions), depending on the functional split option. The operations of the DUs may be controlled by the CU.

The IAB donor 110 may serve directly connected IAB nodes such as the IAB node 120-11 and IAB node 120-12, and IAB nodes that are chained over multiple wireless backhaul hops such as IAB node 120-21, IAB node 120-22 and IAB node 120-31. The IAB donor 110 may also serve directly connected terminal devices (not shown). The IAB node 120 may serve one or more terminal devices directly connected to the IAB node 120. For example, as shown in FIG. 1, the IAB node 120-11 may serve a terminal device 130 directly connected to the IAB node 120-11, the IAB node 120-21 may serve a terminal device 140 directly connected to the IAB node 120-21, and the IAB node 120-31 may serve a terminal device 150 directly connected to the IAB node 120-31.

It is to be understood that the number of IAB nodes and terminal devices connected to the IAB nodes is only for the purpose of illustration without suggesting any limitations. The IAB system may include any suitable number of IAB nodes and terminal devices adapted for implementing example embodiments of the present disclosure.

Figure 2A:
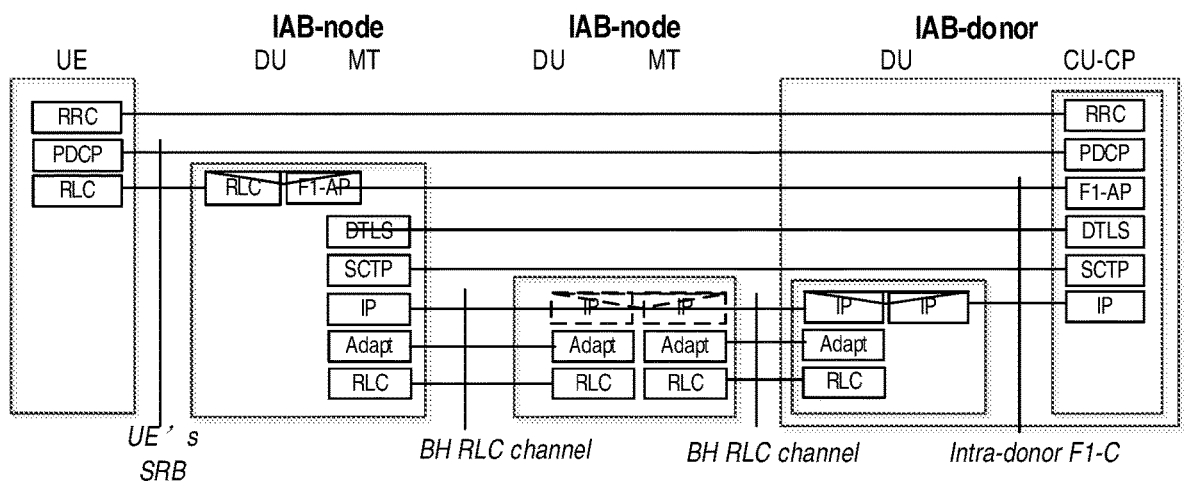
FIGS. 2A-2D are schematic diagrams of examples for IAB systems, respectively.
Figure 2B:
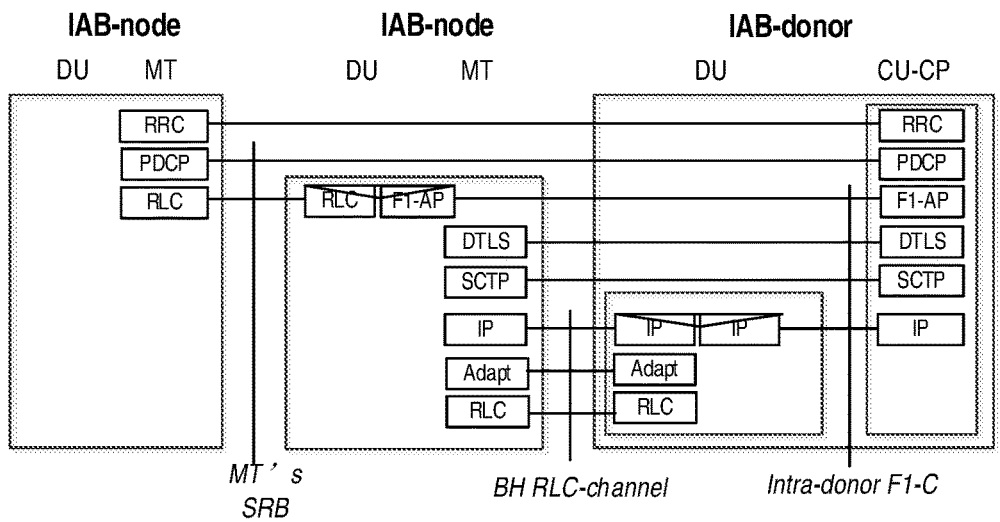
Figure 2C:
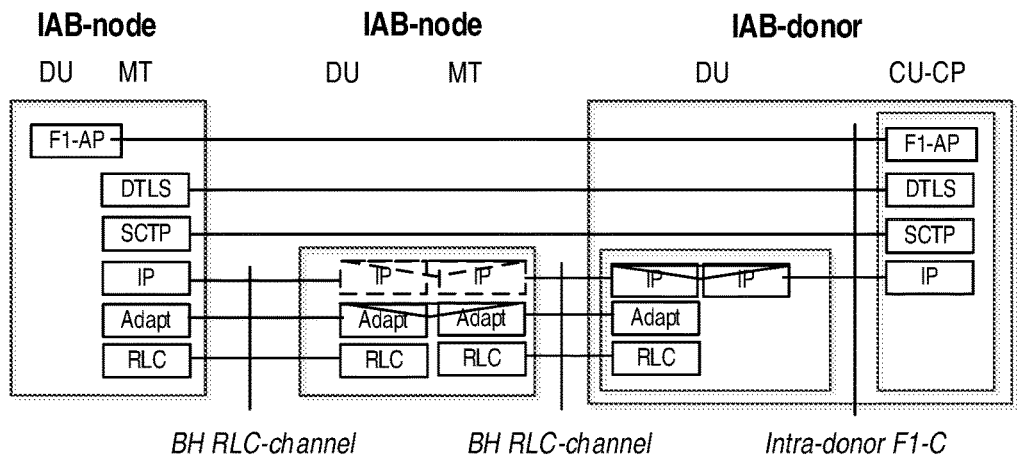
Figure 2D:
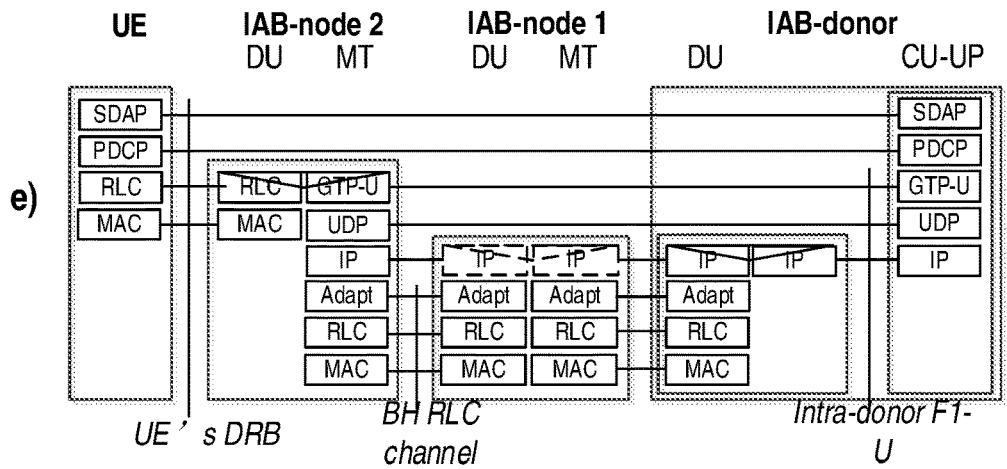

Currently, 3GPP is working on NR Integrated Access and Backhaul (as discussed in 3GPP technical report (TR) 38.874). Among all IAB architectures under consideration, there is one called Architecture 1a which is defined in 3GPP TR 38.874 Section 6.3.1.1. In this architecture, backhauling of F1-U uses an adaptation layer or general packet radio service (GPRS) tunneling protocol (GTP-U) combined with an adaptation layer. In addition, for the protocol stack of Architecture 1a, two Alternatives (called Alternative 2 and 4 respectively) among the plurality of Alternatives have been selected for control plane. FIGS. 2A, 2B, 2C and 2D show protocol stacks for UE's RRC, MT's RRC, DU's F1-AP and user plane respectively according to the Alternative 4. As shown, an adaptation layer resides on top of radio link control (RLC) and carries an IP layer in the Alternative 4. Similarly, Section 8.2.1 of TR 38.874 have also defined a few alternatives for the user plane of the Architecture 1a. FIG. 2D shows an example protocol stack for the user plane.

Taking control plane as an example, the Alternative 4 selected for the control plane has the following five main features.

First, the IP layer carried by adapt is connected to the fronthaul's IP-plane through a routing function at the IAB Donor-DU. On this IP layer, all IAB nodes hold IP addresses, which are routable from the IAB donor CU-CP.

Second, IP address assignment to the IAB node could be based on IPv6 Neighbour Discovery Protocol where the DU acts as an IPv6 router sending out ICMPv6 Router Advertisement (RA) over one or more backhaul bearer towards the IAB node. Other methods are not excluded.

Third, the extended IP-plane allows native F1-C to be used between an IAB-node DU and IAB-donor CU-CP. Signaling traffic can be prioritized on this IP routing plane using differentiated services code point (DSCP) markings in compliance with TS 38.474.

Fourth, F1-C is protected via National Directorate of Security (NDS), e.g. via datagram transport layer security (D-TLS), as established by S3-181838.

Fifth, the UE's and the MT's RRC use signaling radio bearer (SRB), which is carried over F1-C in compliance with TS 38.470.

Even though there have been a few features discussed for the Architecture 1a, in order to implement the Alternative 4, more thoughts and efforts are still needed. In one aspect, in order to support the Alternative 4 of the Architecture 1a, one problem needs to be addressed is how to manage IP addresses of IAB nodes, that is, the IAB node's IPv6 address needs to be assigned appropriately so as to realize communication between the Donor-CU and the IAB nodes. More specifically, there are two basic requirements needs to be satisfied.

First, it is required that an IAB node's IPv6 address shall be related to a Donor-DU. This is because when the Donor-CU sends an IP packet (for example, carrying the F1 application protocol (F1AP) message, or SCTP packet) with destination IP address set to the IAB node's IPv6 address, the IP packet shall be routed to the Donor-DU. That is, Donor-DU is acting as an anchor and the message is routed via the Donor-DU to the IAB node. Similar requirement also applies to the user plane of the Architecture 1a. That is, when the Donor-CU sends a GTP-U packet with destination IP address set to IAB node's address, the GTP-U packet must be routed to the Donor-DU. Then the Donor-DU will route the GTP-U packet to the IAB node. This does not preclude any other IP packet sent to the IAB node, when the destination IP address of the IP packet is set to the IAB node's IPv6 address. These IP packets shall be routed to the Donor-DU.

Second, it is required that the Donor-CU knows the IAB node's IPv6 address before the IAB-DU initiates stream control transmission protocol (SCTP)/F1AP Setup procedure. This is due to that the adaptation layer in an intermediate IAB node(s) and Donor-DU need to be preconfigured before the IAB-DU initiates the SCTP/F1AP Setup procedure.

To meet the above two requirements, there are four conventional solutions being studied.

The first one is an IPv6 address management solution in current 5G system. In this solution, first, a session management function (SMF) provides an interface identity during a protocol data unit (PDU) session establishment procedure (which is defined in TS 23. 501). Then the UE initiates the internet control message protocol version 6 (ICMPv6) procedure, and the SMF provides the IPv6 prefix to the UE. In addition, to ensure that the link-local address generated by the UE does not collide with the link-local address of the UPF and the SMF, the SMF shall provide an interface identifier (see request for comments (RFC) 4862 [10]) to the UE and the UE shall use this interface identifier to configure its link-local address. Moreover, the IPv6 related messages (e.g., Router Solicitation, RA, Neighbor Solicitation, Neighbor Advertisement) are transferred between the SMF and UE via the user plane functions (UPFs).

Also, in this solution, it is defined in technical specification (TS) 24.501 that, for IPv6 protocol data unit (PDU) session type and for IPv4v6 PDU session type, the UE shall build an IPv6 link local address based on the allocated interface identifier for the IPv6 link local address. Also, the UE shall obtain/64 IPv6 prefix via IPv6 stateless address auto-configuration as specified in 3GPP TS 23.501 [8] and Internet Engineering Task Force IETF RFC 4862 [39]; and may obtain IPv6 configuration parameters via stateless dynamic host configuration protocol version 6 (DHCPv6) as specified in IETF RFC 3736 [35].

However these current mechanisms in current 5G system as above are designed with the assumption that the UPF is an anchor point, i.e., the downlink (DL) IP packet with the UE's IP address as the target IP address is routed to the UPF. This does not work for the IAB case, where the Donor-DU is the anchor point for the DL stream control transmission protocol (SCTP)/F1AP packet (for control plane), and the GTP-U packet (for user plane).

The second conventional scheme is an enhanced IPv6 address management in 5G system. In this one, the Donor-CU provides the Donor-DU's IPv6 prefix to a SMF via AMF. The SMF then provides the Donor-DU's IPv6 prefix to the IAB node when the IAB node initiates ICMPv6 procedure. However, this still have some issues. The ICMPv6 message is exchanged between the UE and the SMF via UPF. Whereas, since there are normally many Donor-DUs in an IAB system, the SMF cannot know the related Donor-DU when it receives the ICMPv6 Router Solicitation message from the IAB-MT. Therefore, the SMF cannot know which IPv6 prefix is the right one, to be provided to the UE.

The third conventional scheme is an operation administration and maintenance (OAM) based solution. In this solution, when the IAB node connects to the OAM system for provisioning its cell identity, the OAM also provides the connected Donor-DU's IPv6 prefix to the IAB node. Thus, the IAB node can build its IPv6 address. However, the Donor-CU does not know the IAB node's IPv6 address, therefore it is not be able to configure the adaptation layer before the IAB-DU initiates SCTP/F1AP Setup procedure.

In the fourth conventional scheme being considered, IP address assignment to an IAB node is based on IPv6 Neighbour Discovery Protocol where a DU acts as an IPv6 router sending out ICMPv6 RA over one or more backhaul bearer towards the IAB nodes. One example procedure is as follows.

In the first step, an IAB node connects as an MT to the donor CU using conventional UE methods (RRC setup request). Then, the UE register to a core network and triggers UE context setup in radio access network (RAN) (see discussion on core network (CN) impacts in next section). After that, the donor CU configures one or more backhaul bearers towards the IAB node (and configures the adaption layer at the IAB node and the node serving the IAB node (i.e. another IAB node or the donor DU)). In the fourth step, the donor DU sends out ICMPv6 RA to the IAB node. It is also possible for IAB node to initiate this by sending ICMPv6 Router Solicitation (RS). In the fifth step, the IAB node, when it receives the ICMPv6 RA, it will generate one or more IPv6 addresses. In the sixth step, the IAB node announces the IP addresses to the donor DU using ICMPv6 Neighbor Solicitation and Neighbor Advertisement. Last, the donor DU creates a mapping between IP address(es) of the IAB node and corresponding adaptation layer address and backhaul bearer.

However, there are a few special needs in this fourth conventional scheme, including but not limited to the following.

The first issue is that IAB does not support multicasting as required by the ICMPv6. As mentioned in request for comments (RFC) 2491, a key assumption made by neighbor discovery protocol is that the link technology underlying a given IP interface is capable of native multicasting. Whereas, some work has been done to support Neighbor Discovery (ND) in non-broadcast multi-access (NBMA) links. For example, RFC 4861 states that the details of how one uses ND on NBMA links are addressed in RFC 2491. In addition, RFC3314 and RFC 3316 respectively discuss the use of this protocol over some cellular links, which are examples of NBMA links. The method described in RFC3314 has been captured in TS23.401 and TS24.301 for LTE, and TS23.501 and TS24.501 for 5G respectively. However, none of them can be used for IAB case. Therefore, the IAB backhaul does not provide a native multicasting.

The second issue is that there is a need of special processing for ICMP packets over the air interface. For a normal user plane packet, a serving IAB node puts the received user plane packet in a GTP-U packet, and then forwards it to an upstream IAB/DU. Whereas for ICMP, the serving IAB cannot put the received ICMP packet in a GTP-U packet. If it did the GTP-U packet would be sent to the Donor-CU which terminates the GTP-U tunnel rather than the Donor DU where ICMP is terminated.

Third, in order to support multicasting the ICMP packet, special processing is needed in the adaptation layer. When an IAB node receives the ICMPv6 RA, the IAB has to send it to all connected downstream IAB nodes, even if an IAB node has already gotten the IPv6 prefix. For example, there may be an IAB-MT that has just connected to an IAB node and requires a RA, which is routed via the upstream node using the adaptation layer.

The fourth issue is that there is a need of special processing for the adaptation header. One of the user plane alternatives uses the IP address in adaptation header. In the ICMP procedure, the IAB node does not have an IP address yet, thus it requires a new type of adaptation header to route the ICMP packets.

To sum up, to solve the above or potential issues of the four conventional schemes a new solution is needed. Embodiments of the present disclosure provide a solution for managing the IPv6 address of the IAB node in the Donor-CU and the IAB node, so that future communication between the Donor-CU and the IAB node via the Donor-DU, and any other communications to the IAB node via the Donor-DU can be implemented. In addition, the IPv6 prefix for the IAB node can be managed without requiring ICMP procedures. Thus, the complexity of the ICMPv6 does not need to be implemented in the Donor-DU.

Figure 3:
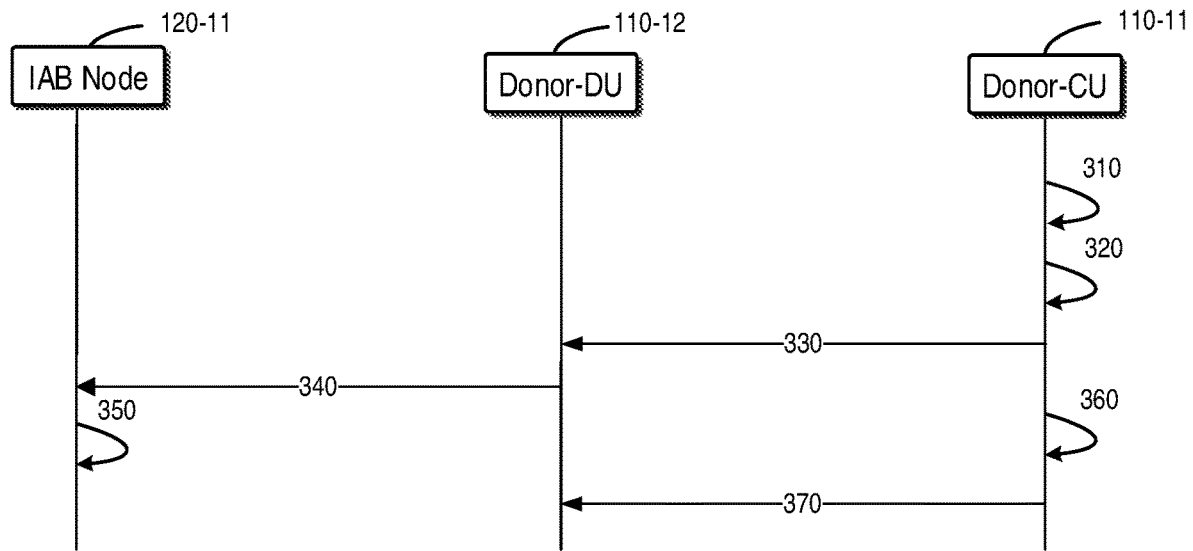
FIG. 3 is a signaling chart of an example process for IPv6 address management for IAB node in accordance with some embodiments of the present disclosure.

More details of the principle and implementations of the present disclosure will be described in detail below with reference to FIG. 3-8. FIG. 3 shows a signaling chart of an example process for IPv6 address management for IAB node in accordance with some embodiments of the present disclosure. The signaling or part of the signaling in the FIG. 3 may be part of the UE Initial Access procedure as defined in TS 38.401 of 3GPP.

First, as shown in FIG. 3, a Donor-CU 110-11 in an IAB system obtains 310 an IPv6 prefix associated with a Donor-DU 110-12. Since it is required that the Donor-DU acts as an anchor for the IAB node in the IAB system, the IPv6 prefix is associated with the Donor-DU. As such, the Donor-DU may act as an anchor for an IAB node in the IAB system. Donor-CU may obtain the IPv6 prefix of the Donor-DU during e.g., an F1AP procedure, a UE-associated procedure for the IAB-MT, or via OAM. The details on how to obtain the IPv6 prefix will be introduced in the following parts.

In some embodiments, the IPv6 prefix associated with the Donor-DU or the Donor-CU may be an IPv6 prefix of the Donor-DU. The case as such is currently documented as a possible option 3GPP TR38.874.

When the IPv6 prefix of the Donor-DU is used as the IPv6 prefix for the IAB, in one example, the Donor-CU may obtain the IPv6 prefix of the Donor-DU by receiving a message from the Donor-DU. The message comprises the IPv6 prefix of the Donor-DU. More details about this scheme will be introduced with reference to FIGS. 4 and 5 respectively in the following part. In another example, the Donor-CU may be preconfigured with the IPv6 prefix of the Donor-DU. As a result, the Donor-CU may obtain the pre-configured IPv6 prefix of the Donor-DU locally. In a further example, the Donor-CU may derive the IPv6 prefix of the Donor-DU when the Donor-DU initiates the SCTP setup procedure.

In some other embodiments, the IPv6 prefix associated with the Donor-DU or the Donor-CU may be an IPv6 prefix of the Donor-CU. In this case, Donor-CU does not need to receive any message to obtain the IPv6 prefix associated with the Donor-DU or the Donor-CU. In addition, one advantage of this scheme is that if an IAB node hands-off to a different Donor-DU under the same Donor-CU, the IAB node address does not have to be reassigned. It should be understood that these schemes are discussed for examples, rather than suggesting any limitation. There may be other suitable ways to obtain the IPv6 prefix to be used for the IAB node.

Second, as shown in FIG. 3, the Donor-CU 110-11 determines 320 an interface identity for the IAB node. It is the Donor-CU's responsibility to ensure that the interface identity being determined is unique. For example, this interface identity is unique for IAB nodes served by the same Donor-DU. In some embodiments, this interface identity is unique for IAB nodes served by the same Donor-CU. For example, the IAB node can continue to use this interface identity when it is handover to a different Donor-DU of the same Donor-CU.

In some embodiments, the interface identity may be allocated by the Donor-CU, for example, based on an UE F1AP identity. The UE F1AP identity, or called gNB-CU UE F1AP ID in the 3GPP uniquely identifies the UE association over the F1 interface within the gNB-CU as defined in TS 38.473.

More specifically, for a UE (i.e., IAB node in this case), both the serving DU (i.e., a Donor-DU or a parent IAB node) and the Donor-CU allocates a UE F1AP identity respectively, i.e., DU UE F1AP ID and CU UE F1AP ID. The interface identity is 64-bit. The F1AP ID is 32-bit.

In one embodiment, the Donor-CU may determine the interface identity based only on the CU UE F1AP ID. As such, the 64-bit interface identity may be a duplication of the 32-bit CU UE F1AP ID. For example, both the high 32-bit and the low 32-bit of the interface identity contain the same the CU UE F1AP ID.

In another embodiment, the Donor-CU may allocate 320 the interface identity based on both the CU UE F1AP ID and DU UE F1AP ID. Then, the high 32-bit may be CU UE F1AP ID, and the low 32-bit may be DU UE F1AP ID, or vice versa.

In some other embodiments, the interface identity may be generated based on knowledge known in both the Donor-CU and IAB node. That is the knowledge is common to both the Donor-CU and IAB node, for example, the cell identity of the serving cell for the IAB node and a C-RNTI allocated to the IAB node defined in 3GPP TS 38.473. The cell identity, or called NR cell global identifier (NR CGI) is used to globally identify a cell. The C-RNTI which is defined in 3GPP TS 38.331 is a cell radio network temporary identifier. The Donor-CU may obtain these two pieces of information from a F1AP INITIAL UL RRC MESSAGE TRANSFER message received from the Donor-DU or the IAB node.

In one scenario, which is as shown in FIG. 3, the F1AP message may be initiated from the Donor-DU to the Donor-CU, for example, when the IAB node directly connects to the Donor-DU. In another scenario, the F1AP message may be sent from an IAB node which acts as an IAB-DU to the Donor-CU, for example, when the IAB node connects to the Donor-DU via another IAB node. In this scenario, the IAB node may be the one which is directly connected to a UE that initiate the RRC message the protocol stack of which is as shown in FIG. 2A.

It should be understood that the schemes are discussed for examples, rather than suggesting any limitation. There may be other suitable ways to determine the interface identity.

Third, as shown in FIG. 3, when the Donor-CU 110-11 knows the connected UE is an IAB node, the Donor-CU 110-11 transmit 330 to the Donor-DU 110-12 a F1AP message, for example, a F1AP DL RRC MESSAGE TRANSFER message, that comprises the IPv6 prefix to be used by the IAB node associated with the Donor-DU or the Donor-CU. In some embodiments, the IPv6 prefix to be used by the IAB node associated with the Donor-DU or the Donor-CU may be the IPv6 prefix of the Donor-DU or Donor-CU. The IPv6 prefix may be part of the RRC Container IE of the F1AP message. In other embodiment, when the IP prefix is to be broadcast by the Donor-DU or the serving IAB node, the Donor-CU initiates a F1AP procedure to configure the SIB, i.e. to include the IPv6 prefix, to be used by the IAB node.

Alternatively or additionally, the Donor-CU 110-11 may transmit 330 information about the interface identity to the Donor-DU 110-12. The information about the interface identity is determined by the Donor-CU, which includes the interface identity allocated by the Donor-CU, or indicates the interface identity is generated at the Donor-CU and IAB node respectively based on knowledge of the UE that is common to these two node, for example C-RNTI and the identity of the serving cell for the IAB node, known in the Donor-CU and IAB node.

In some examples, the information about the interface identity may be sent from the Donor-CU to Donor-DU in the same F1AP message as the IPv6 prefix associated with the Donor-DU or the Donor-CU. For example, the information about the interface identity is part of the RRC Container IE of the F1AP DL RRC MESSAGE TRANSFER message. Alternatively, the interface identity and the IPv6 prefix may be sent separately with different messages. In some embodiment, when the interface identity is generated at the Donor-CU and IAB node respectively based on the knowledge of the UE, the Donor-CU initiates a F1AP procedure to configure the SIB, i.e. to indicate the interface identity is generated respectively in the Donor-CU and the IAB node. The Donor-CU may use the same F1AP procedure as the one used by the Donor-CU to configure the broadcast of the IPv6 prefix in the Donor-DU or serving IAB node, or separate F1AP procedure.

In some embodiments, the information about the interface identity is an interface identity (e.g., a 64-bits interface identity) of the IAB node being generated by the Donor-CU as mentioned above. Alternatively, the information about the interface identity indicates that the interface identity is generated based on common identities known in Donor-CU and IAB node, for example, the cell identity of the serving cell for the IAB node and a C-RNTI allocated to the IAB-node.

Fourth, upon receiving the IPv6 prefix, the Donor-DU 110-12 may transmit it 340 to the IAB node 120. The IPv6 prefix is associated with the Donor-DU or Donor-CU, and is obtained from the Donor-CU of the IAB. The Donor-DU acting as an anchor for the IAB node in the IAB system.

In one embodiment, the IPv6 prefix may be included in a unicast RRC signaling (e.g., RRC Reconfiguration message) and be sent to the IAB node. Alternatively, the IPv6 prefix may be broadcast over the air interface as part of a broadcast RRC message. The broadcast RRC message may be a system information block (SIB) message as defined in Section 5.2 of TS38.331. The format of the SIB message may be conventional, or a modification of a conventional message, or a new SIB message.

Upon receiving the information about the interface identity determined for the IAB node 120, the Donor-DU 110-12 may transmit 340 it to the IAB node 120. In one embodiment, the information may be included in the unicast RRC signaling, (e.g., RRC Reconfiguration message) and be sent to the IAB node. In another embodiment, the information may be part of the broadcast RRC signaling (e.g. SIB message), to indicate the interface identify is to be generated respectively in the Donor-CU and the IAB node based on the knowledge of the IAB node.

Fifth, when the IPv6 prefix and/or the information about the interface identity are received by the IAB node 120, it may generate 350 its own IPv6 address for communication between the Donor-CU and the IAB node. The IPv6 address can also be used for communication between the IAB node and other node, for example, an OAM server.

In some embodiments, in response to determining that the information about the interface identity is the 64-bits interface identity of the IAB node being generated by the Donor-CU as mentioned above, the IAB node may extract the interface identity from the information about the interface identity, and generate 350 its own IPv6 address directly based on the received IPv6 prefix and the interface identity.

In some other embodiments, in response to determining that the information about the interface identity indicates that the interface identity is generated based on knowledge of the IAB node, for example, the identity of the serving cell for the IAB node and a C-RNTI allocated to the IAB-node, the interface identity is generated locally by the IAB node by itself based on knowledge of the IAB node, for example, the cell identity of the serving cell for the IAB node and a C-RNTI allocated to the TAB node. Therefore, there is no need to include the interface identity, or the cell identity and C-RNTI, in the unicast RRC message to the IAB-MT. After that, the IAB node may generate 350 its own IPv6 address based on the locally generated interface identity and the received IPv6 prefix.

Sixth, the Donor-CU 110-11 also generates 360, based on the IPv6 prefix and the interface identity, an IPv6 address for the IAB node for communication between the Donor-CU 110-11 and the IAB node 120. Donor-CU may generate 360 the IPv6 address after it determines 320 the interface identity. Alternatively, it may also generate 360 the IPv6 address before, or when the IAB node generate 350 the IPv6 address. That is, the timing of generating is not limited herein.

That is, both the IAB node 120 and Donor-CU 110-11 generate the same IPv6 address for the IAB node based on the IPv6 prefix, for example, associated with the Donor-DU 110-12 or the Donor-CU 110-11, and the unique interface identity determined by the Donor-CU 110-11.

As a result, the IPv6 address of the IAB node can be managed appropriately in the Donor-CU and the IAB node, so that future communication between the Donor-CU and the IAB node via the Donor-DU can be implemented. In addition, the IPv6 prefix for the IAB node can be managed without requiring additional ICMP procedures. Thus, the complexity of the ICMPv6 does not need to be implemented in the Donor-DU. Furthermore, the native multicast, or additional work to support the ICMPv6 over the unicast backhaul is not required.

Seventh, the Donor-CU 110-11 may configure 370, based on the generated IPv6 address, at least one of the Donor-DU 110-12 and an intermediate IAB node (not shown in the figure, for example, in multi-hop scenario), such that an adaptation layer of the at least one of the Donor-DU 110-12 and the intermediate IAB node is configured for routing a message or a packet between the Donor-CU 110-11 and the IAB node. That is, the Donor-CU 110-11 can further use the generated IPv6 address of the IAB-MT to configure the adaptation layer in the Donor-DU 110-12, and in the intermediate IAB nodes if any, before the IAB node initiates SCTP/F1AP Setup procedure. The normal initial UE access procedure may continue. This avoids having a new adaptation layer dedicated to ICMP procedures as in some of the conventional schemes as mentioned before, thereby not requiring the change to the adaptation layer of the IAB node.

In some embodiments (not shown), The IAB node 120 may save the received IPv6 prefix. IAB node 120 may broadcast the IPv6 prefix over the air. The saved IPv6 prefix may also be used later when a further IAB node connects to the IAB node 120 (e.g., in a multi-hop scenario). In that case, the IAB node 120 acts as the serving IAB node. The IAB node 120 includes the previous received IPv6 prefix of the Donor-DU 110-12 or Donor-CU 110-11 in a F1AP message to the Donor-CU 110-11 during the further IAB node's initial access procedure.

Figure 4:
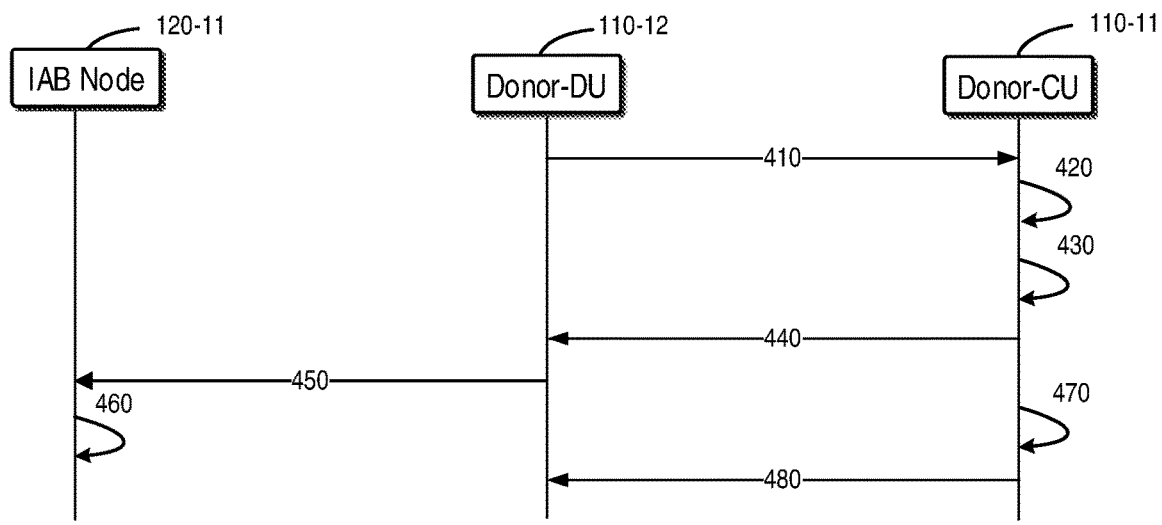
FIG. 4 is a signaling chart of an example process for IPv6 address management for IAB node in accordance with some embodiments of the present disclosure.

In addition to the above embodiments, there is a variety of implementation for managing IPv6 address for IAB nodes. FIG. 4 shows another example process for IPv6 address management for IAB node in accordance with some embodiments of the present disclosure. In the embodiments shown with respect to FIG. 4, the IPv6 prefix is received from the Donor-DU instead of pre-configuring the IPv6 prefix locally.

As shown in FIG. 4, the Donor-DU 110-12 transmits 410 a F1AP message to the Donor-CU 110-11. In one example, the F1AP message may be a F1 Setup Request message. In addition, the message comprises an IPv6 prefix of the Donor-DU. As such, the Donor-CU is informed of the IPv6 prefix of Donor-DU. It should be understood that the schemes are discussed for examples, rather than suggesting any limitation.

Upon receiving the F1AP message, from the Donor-DU 110-12, the Donor-CU 110-11 could obtain 420 the IPv6 prefix from the F1AP message.

Then, the Donor-CU 110-11 may determine 430 an interface identity for the IAB node 120. The way of determining the interface identity is similar to those mentioned before and thus will be not repeated herein.

In one embodiment, once the IPv6 prefix associated with the Donor-DU or the Donor-CU is obtained, the Donor-CU may transmit 440 the IPv6 prefix and the information of the interface identity to the Donor-DU. Upon receiving the IPv6 prefix and the information of the interface identity, the Donor-DU will transmit 450 it to the IAB node and so on. Steps 420-480 corresponds to steps are 310-370 in FIG. 3 respectively, so details of these steps are omitted.

Figure 5:
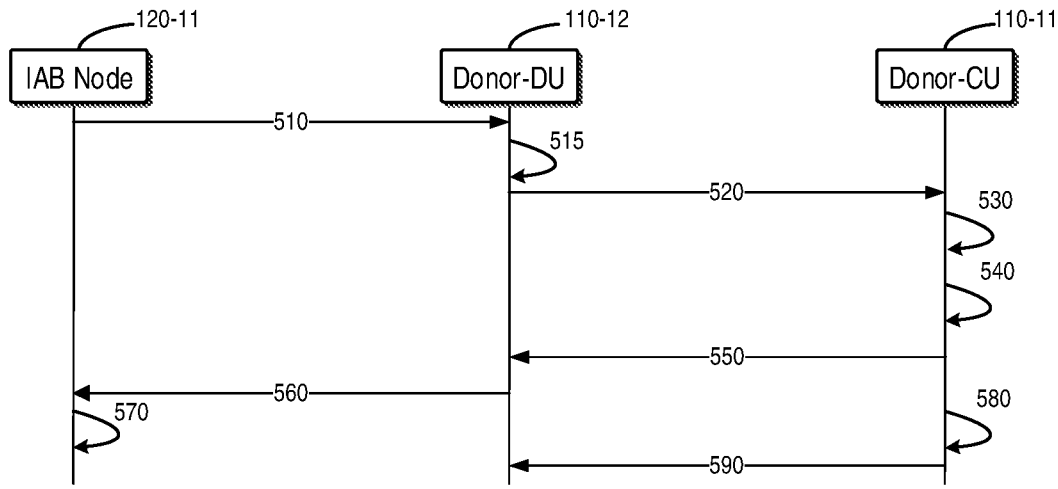
FIG. 5 is a signaling chart of an example process for IPv6 address management for IAB node in accordance with some embodiments of the present disclosure.

FIG. 5 shows another example process for IPv6 address management for IAB node in accordance with some embodiments of the present disclosure. In the embodiments shown with respect to FIG. 5, the IPv6 prefix is received from the Donor-DU as well. The main difference from FIG. 5 to FIG. 4 is that the IPv6 prefix is added into a F1AP message that was trigged by the RRC message originally sent from an IAB node and then encapsulated in a F1AP message at the Donor-DU.

More specifically, as shown in FIG. 5, IAB node 120 transmits 510 a RRC message (e.g., a RRC setup message). In some embodiments, when the Donor-DU 110-12 encapsulates the RRC message in a F1AP message, it may add 515 its own IPv6 prefix into the message, for example, when the Donor-DU 110-12 determines that it does not provide its IPv6 prefix to the Donor-CU 110-11 in any previous message (e.g., a F1AP Setup Request message). After that, the Donor-DU will transmit 520 the F1AP message to the Donor-CU. Steps 530-590 corresponds to steps are 310-370 in FIG. 3 respectively, so details of these steps are omitted herein.

In one embodiment, the F1AP message may be a F1AP INITIAL UL RRC MESSAGE TRANSFER message. The following steps 530, 540, 550, 560, 570 and 580 are similar to those corresponding ones described above with reference to FIGS. 3 and 4 respectively, thus will not be repeated herein.

Figure 6:
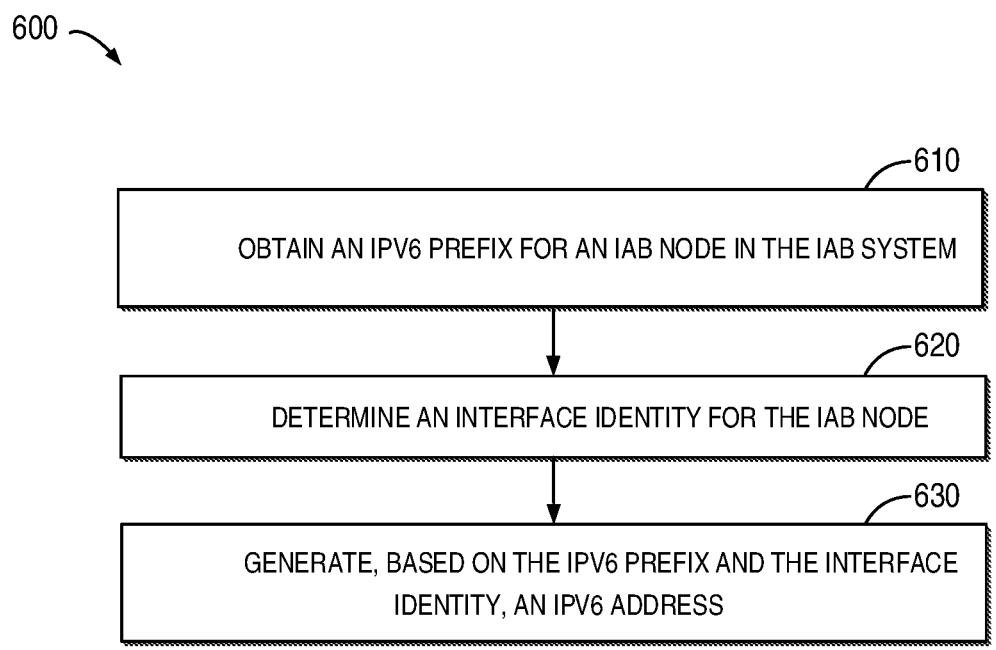
FIG. 6 is a flowchart of a method implemented at a Donor-CU in an IAB system in accordance with some example embodiments of the present disclosure.

FIG. 6 is a flowchart of a method implemented at a Donor-CU in an IAB system according to some example embodiments of the present disclosure. The method can be implemented at the Donor-CU 110-11 as shown in FIG. 1. For the purpose of discussion, the method 600 will be described with reference to FIG. 1.

At block 610, the Donor-CU 110-11 obtains an IPv6 prefix for the IAB node 120 in the IAB system. The IPv6 prefix may be associated with a Donor-DU or a Donor-CU in the IAB system.

At block 620, the Donor-CU 110-11 determines a unique interface identity for the IAB node 120, or the interface identity to be generated at the Donor-CU and IAB-node respectively based on knowledge of the IAB node.

At block 630, the Donor-CU 110-11 generates, based on the IPv6 prefix and the interface identity, an IPv6 address for the IAB node 120 for communication between the Donor-CU 110-11 and the IAB node 120, and for other communication between any other network node, for example, an OAM server, and the IAB node.

In some embodiments, the method further comprises transmitting, to the IAB node via the donor distributed unit, a first message comprising the IPv6 prefix.

In some embodiments, the first message comprises at least one of: an IPv6 prefix of the donor distributed unit; and an IPv6 prefix of the donor central unit controlling the operations of the donor distributed unit.

In some embodiments, the first message further comprises the information about the interface identity.

In some embodiments, the first message is a unicast radio resource control, RRC, message or a broadcast RRC message.

In some embodiments, determining the interface identity for the IAB node comprises at least one of central unit allocating the interface identity unique to the donor central unit; and generating the interface identity central unit based on knowledge of the IAB node.

In some embodiments, the method further comprises transmitting a second message comprising the information about the interface identity to the IAB node via the donor distributed unit.

In some embodiments, the second message is a unicast radio resource control, RRC, message or a broadcast RRC message.

In some embodiments, the method further comprises configuring, based on the IPv6 address, at least one of the donor distributed unit and a further IAB node, such that an adaptation layer of the at least one of the donor distributed unit and the further IAB node is configured for routing a message or a packet between the donor central unit and the IAB node.

In some embodiments, obtaining the IPv6 prefix comprises receiving, from the donor distributed unit, a third message comprising an IPv6 prefix of the donor distributed unit, the third message being a front-haul application protocol, F1AP, message.

In some embodiments, obtaining the IPv6 prefix comprises obtaining a pre-configured IPv6 prefix of the donor distributed unit.

In some embodiments, an apparatus capable of performing the method 600 (for example, the Donor-CU) may comprise a means for performing the respective steps of the method 600. The means may be implemented in any suitable form. For example, the means may be implemented in a circuitry or software module.

In some embodiments, the apparatus comprises a means for obtaining an IPv6 prefix for an IAB node in the IAB system, the prefix being associated with a donor distributed unit or the donor central unit in the IAB system; a means for determining an interface identity for the IAB node; and a means for generating, based on the Internet Protocol Version 6, IPv6, prefix and the interface identity, an IPv6 address for the IAB node for communication between the donor central unit and the IAB node.

In some embodiments, the apparatus further comprises a means for transmitting, to the IAB node via the donor distributed unit, a first message comprising the IPv6 prefix.

In some embodiments, the first message comprises at least one of an IPv6 prefix of the donor distributed unit; and an IPv6 prefix of the donor central unit controlling the operations of the donor distributed unit.

In some embodiments, the first message further comprises the information about the interface identity.

In some embodiments, the first message is a unicast radio resource control, RRC, message or a broadcast RRC message.

In some embodiments, the means for determining the interface identity for the IAB node comprises at least one of a means for allocating the interface identity unique to the donor central unit; and a means for generating the interface identity based on knowledge of the IAB node.

In some embodiments, the apparatus further comprises a means for transmitting a second message comprising the information about the interface identity to the IAB node via the donor distributed unit.

In some embodiments, the second message is a unicast radio resource control, RRC, message or a broadcast RRC message.

In some embodiments, the apparatus further comprises a means for configuring, based on the IPv6 address, at least one of the donor distributed unit and a further IAB node, such that an adaptation layer of the at least one of the donor distributed unit and the further IAB node is configured for routing a message or a packet between the donor central unit and the IAB node.

In some embodiments, the means for obtaining the IPv6 prefix comprises a means for receiving, from the donor distributed unit, a third message comprising an IPv6 prefix of the donor distributed unit, the third message being a front-haul application protocol, F1AP, message.

In some embodiments, the means for obtaining the IPv6 prefix comprises a means for obtaining a pre-configured IPv6 prefix of the donor distributed unit.

Figure 7:
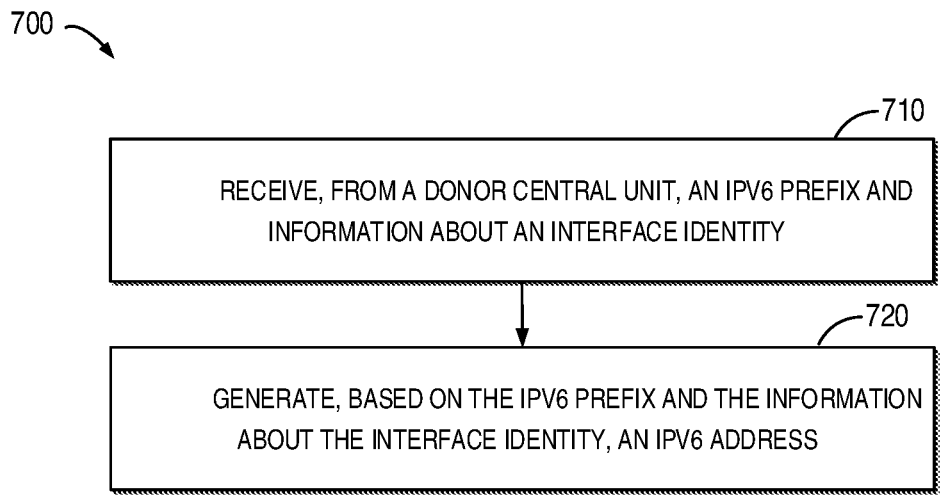
FIG. 7 is a flowchart of a method implemented at an IAB node in an IAB system in accordance with some example embodiments of the present disclosure.
Figure 8:
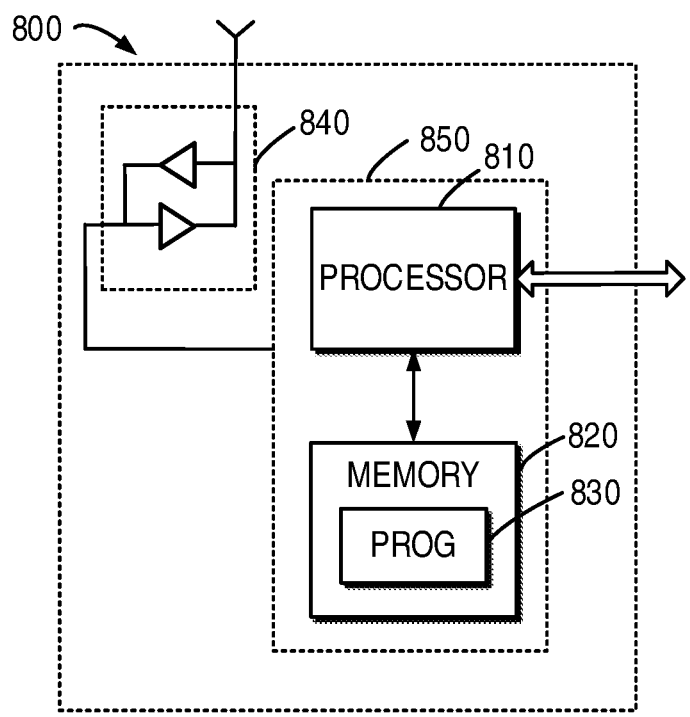
FIG. 8 is a block diagram of a device that is suitable for implementing example embodiments of the present disclosure.

FIG. 7 is a flowchart of a method in an IAB system in accordance with some example embodiments of the present disclosure. The method can be implemented at the IAB node 120 as shown in FIG. 1. For the purpose of discussion, the method 700 will be described with reference to FIG. 1.

At block 710, the IAB node receives, from a Donor-CU 110-11 in the IAB system via a Donor-DU in the IAB system, an IPv6 prefix and information about an interface identity. The IPv6 prefix is associated with the Donor-DU or the Donor-CU.

At block 720, the IAB node 120 generates, based on the IPv6 prefix and the information about the interface identity, an IPv6 address for the IAB node for communication between the Donor-CU 110-11 and the IAB node 120.

In some embodiments, receiving the IPv6 prefix and the information about interface identity comprises receiving the IPv6 prefix in a first message, the first message being a unicast radio resource control, RRC, message or a broadcast RRC message; and receiving the information about interface identity in a second message, the second message being a unicast radio resource control, RRC, message or a broadcast RRC message.

In some embodiments, receiving the IPv6 prefix and the information about interface identity comprises receiving the IPv6 prefix and the information about interface identity in a first message, the first message being a unicast radio resource control, RRC, message or a broadcast RRC message.

In some embodiments, the method further comprises, in response to the information indicating that the interface identity is allocated by the donor central unit, extracting the interface identity from the information about the interface identity; and in response to the information indicating that the interface identity is generated by the donor central unit based on knowledge of the IAB node, generating the interface identity based on the same knowledge of the IAB node.

In some embodiments, an apparatus capable of performing the method 700 (for example, the IAB node) may comprise a means for performing the respective steps of the method 700. The means may be implemented in any suitable form. For example, the means may be implemented in a circuitry or software module.

In some embodiments, the apparatus comprises a means for receiving, from a donor central unit in the IAB system via a donor distributed unit in the IAB system, an IPv6 prefix and information about an interface identity, the prefix being associated with the donor distributed unit or the donor central unit; and a means for generating, based on the IPv6 prefix and the information about the interface identity, an IPv6 address for the IAB node for communication between the donor central unit and the IAB node.

In some embodiments, the means for receiving the IPv6 prefix and the information about interface identity comprises a means for receiving the IPv6 prefix in a first message, the first message being a unicast radio resource control, RRC, message or a broadcast RRC message; and a means for receiving the information about interface identity in a second message, the second message being a unicast radio resource control, RRC, message or a broadcast RRC message.

In some embodiments, the means for receiving the IPv6 prefix and the information about interface identity comprises a means for receiving the IPv6 prefix and the information about interface identity in a first message, the first message being a unicast radio resource control, RRC, message or a broadcast RRC message.

In some embodiments, the apparatus further comprises in response to the information indicating that the interface identity is allocated by the donor central unit, a means for extracting the interface identity from the information about the interface identity; and in response to the information indicating that the interface identity is generated by the donor central unit based on knowledge of the IAB node, a means for generating the interface identity based on the same knowledge of the IAB node.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 3 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 810 may form processing means 850 adapted to implement various embodiments of the present disclosure.

The memory 810 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 810 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A communication method implemented at a donor central unit in an integrated access and backhaul, IAB, system, comprising:
by the donor central unit, obtaining an Internet Protocol Version 6, IPv6, prefix for an IAB node in the IAB system, the prefix being associated with the donor central unit or a donor distributed unit in the IAB system;
by the donor central unit, determining an interface identity for the IAB node; and
by the donor central unit, generating, based on the Internet Protocol Version 6, IPv6, prefix and the interface identity, an IPv6 address for the IAB node for communication between the donor central unit and the IAB node.

2. The method of claim 1, further comprising: transmitting, to the IAB node via the donor distributed unit, a first message comprising the IPv6 prefix.

3. The method of claim 2, wherein the first message comprises at least one of:
an IPv6 prefix of the donor distributed unit; and an IPv6 prefix of the donor central unit controlling the operations of the donor distributed unit.

4. The method of claim 2, wherein the first message further comprises the information about the interface identity.

5. The method of claim 2, wherein the first message is a unicast radio resource control, RRC, message or a broadcast RRC message.

6. The method of claim 1, wherein determining the interface identity for the IAB node comprises at least one of allocating the interface identity uniquely to the donor central unit; and generating the interface identity based on knowledge of the IAB node.

7. The method of claim 1, further comprising: transmitting a second message comprising the information about the interface identity to the IAB node via the donor distributed unit.

8. The method of claim 7, wherein the second message is a unicast radio resource control, RRC, message or a broadcast RRC message.

9. The method of claim 1, further comprising: configuring, based on the IPv6 address, at least one of the donor distributed unit and a further IAB node, such that an adaptation layer of the at least one of the donor distributed unit and the further IAB node is configured for routing a message or a packet between the donor central unit and the IAB node.

10. The method of claim 1, wherein obtaining the IPv6 prefix comprises:
receiving, from the donor distributed unit, a third message comprising an IPv6 prefix of the donor distributed unit, the third message being a front-haul application protocol, F1AP, message.

11. The method of claim 1, wherein obtaining the IPv6 prefix comprises:
obtaining a pre-configured IPv6 prefix of the donor distributed unit.

12. A non-transitory computer readable medium comprising program instructions for causing an apparatus to perform at least the method of claim 1.

13. A communication method implemented at an integrated access and backhaul, IAB, node in an IAB system, comprising:
by the IAB node, receiving, from a donor central unit in the IAB system via a donor distributed unit in the IAB system, an Internet Protocol Version 6, IPv6, prefix and information about an interface identity, the prefix being associated with the donor distributed unit or the donor central unit; and
by the IAB node, generating, based on the IPv6 prefix and the information about the interface identity, an IPv6 address for the IAB node for communication between the donor central unit and the IAB node.

14. The method of claim 13, wherein receiving the IPv6 prefix and the information about interface identity comprises: receiving the IPv6 prefix in a first message, the first message being a unicast radio resource control, RRC, message or a broadcast RRC message; and receiving the information about interface identity in a second message, the second message being a unicast radio resource control, RRC, message or a broadcast RRC message.

15. The method of claim 13, wherein receiving the IPv6 prefix and the information about interface identity comprises: receiving the IPv6 prefix and the information about interface identity in a first message, the first message being a unicast radio resource control, RRC, message or a broadcast RRC message.

16. The method of claim 13, further comprising: in response to the information indicating that the interface identity is allocated by the donor central unit, extracting the interface identity from the information about the interface identity; and in response to the information indicating that the interface identity is generated by the donor central unit based on knowledge of the IAB node, generating the interface identity based on the same knowledge of the IAB node.

17. A non-transitory computer readable medium comprising program instructions for causing an apparatus to perform at least the method of claim 13.

18. A donor central unit device comprising: at least one processor; and at least one memory including computer program code; the at least one memory and the computer program code configured to, with the at least one processor, cause the donor central unit device to perform at least:
obtain an Internet Protocol Version 6, IPv6, prefix for an integrated access and backhaul, IAB, node in an IAB system, the prefix being associated with the donor central unit or a donor distributed unit in the IAB system;
determine an interface identity for the IAB node; and
generate, based on the Internet Protocol Version 6, IPv6, prefix and the interface identity, an IPv6 address for the IAB node for communication between the donor central unit and the IAB node; and
cause the device to transmit, to the IAB node via the donor distributed unit, a first message comprising the IPv6 prefix.

19. A device comprising: at least one processor; and at least one memory including computer program code; the at least one memory and the computer program code configured to, with the at least one processor, cause the device to perform at least the method of claim 13.

* * * * *